United States Patent

[11] 3,565,366

[72] Inventor William G. Campbell, Jr.
Los Angeles, Calif.
[21] Appl. No. 772,779
[22] Filed Nov. 1, 1968
[45] Patented Feb. 23, 1971
[73] Assignee Ex-Cell-O Corporation
Detroit, Mich.

[54] TAPE TRANSPORT CONTROL SYSTEM
7 Claims, 6 Drawing Figs.

[52] U.S. Cl. 242/190, 242/75.51
[51] Int. Cl. B65h 59/38, B65h 63/02; G11b 15/32
[50] Field of Search 242/189—191, 75.51; 318/6, 7, 309—314, 318

[56] References Cited

UNITED STATES PATENTS 2,985,396 5/1961 Johnson 242/190
3,131,339 4/1964 Burr 318/6
3,223,906 12/1965 Dinger 318/7
3,356,921 12/1967 Bradford et al. 318/318
3,424,392 1/1969 DiVeto et al. 242/190

*Primary Examiner*—Leonard D. Christian
*Attorney*—Christie, Parker & Hale

ABSTRACT: A control circuit for a reel-to-reel tape transport system for controlling the transfer of tape between the reels. The control circuit includes sensing the demand of tape during a tape transfer operation and providing an electrical signal representative of the demand. The demand signal is compared with a feedback signal representative of the speed of the drive for one of the driven reels and providing a control signal corresponding thereto. This control signal is then combined with a reference signal of a preselected frequency to provide a speed control signal that is applied to the drive control to control the speed in accordance with the sensed parameters.

INVENTOR.
WILLIAM G. CAMPBELL, JR.
BY Christie, Parker & Hale
ATTORNEYS.

TAPE TRANSPORT CONTROL SYSTEM

This invention relates to a tape transport system and more particularly to a tape spooler control circuit for controlling the transfer of tape from one reel to another reel upon demand.

Tape transport systems for transferring tape from one reel to another reel are well known. Tape transport systems for transferring paper tape from one reel to another reel are generally known in the art of handling paper tape as tape spoolers. These tape spoolers, generally, are merely employed for transporting paper tape between the reels without any reference to a transducing operation. These tape spoolers, however, are generally employed in some fashion in association with transducers adapted for reading the information recorded on the tape. The important aspect of a tape spooler is the control of the reel drives for effecting the transfer of tape from reel to reel.

At the present time, control circuits for effecting spooling operations are known that employ transistorized control circuits and in particular control circuits utilizing silicon controlled rectifier (S.C.R.) drive components. Generally, however, the control circuits that are presently employed are limited for use at a particular line frequency. It is particularly disadvantageous to employ a control circuit having a silicon control rectifier therein. Since this type of circuit is responsive to signals of a particular frequency it cannot be used in applications wherein the frequency is different from that for which the circuit is designed. To allow such prior art circuits to be employed requires changes in circuit components to cover alternate frequencies or a range of frequencies. This, of course, limits the utilization of such prior art spooling control systems.

The present invention provides an improved tape transport system and more particularly a control circuit that may be used over a wide range of frequencies, on the order of 50—400 cycles, without changing or adding any circuit components for use over this entire frequency range. The spooler control circuit of the present invention may be embodied in a transistor circuit without employing any silicon control rectifier devices (SCR's) or similar devices. Furthermore, the control circuit of the present invention is adapted for spooling paper tape at speeds up to 100 inches per second. The spooler may be advantageously adapted for manual control or remote control in combination with tape transport systems employing transducing means.

Structurally the present invention comprehends a tape transport system having a pair of spaced-apart reels for transporting tape, and in particular paper tape, between the reels. There is provided with each reel a tape tensioning arm over which the tape stored on the reels and to be transferred between the reels is guided. The tape tensioning arms of the present invention function both in the conventional fashion for maintaining tension on the tape extending between the reels and for signalling a change in tension when a tape spooling operation is demanded. The tape tensioning arms provide the initiating signal for effecting the transfer of the tape from reel to reel at the desired speed of transfer of tape as a result of the change of position in the tape tensioning arms. This signal is employed in a control circuit for energizing one of the drive motors for the reels for effecting the correct transfer of tape. The control circuit comprises means for providing a feedback signal from the drive means representative of the speed thereof. The feedback signal is coupled to a comparison means which is compared with the signal resulting from the change in tension in the tape extending between the reels. The comparison output signal from the comparison means is employed as an output control signal. The control circuit further includes means for generating electrical signals of a preselected frequency. The signals of the preselected frequency and the comparison output control signal are combined to provide a speed control signal to the drive motor for effecting the desired transfer of tape between the reels. With the change in tension of the tape extending between the reels, the speed of the drive motor is changed accordingly.

These and other features of the present invention may be more fully appreciated when considered in the light of the following specification and drawings, in which.

Figure 1:
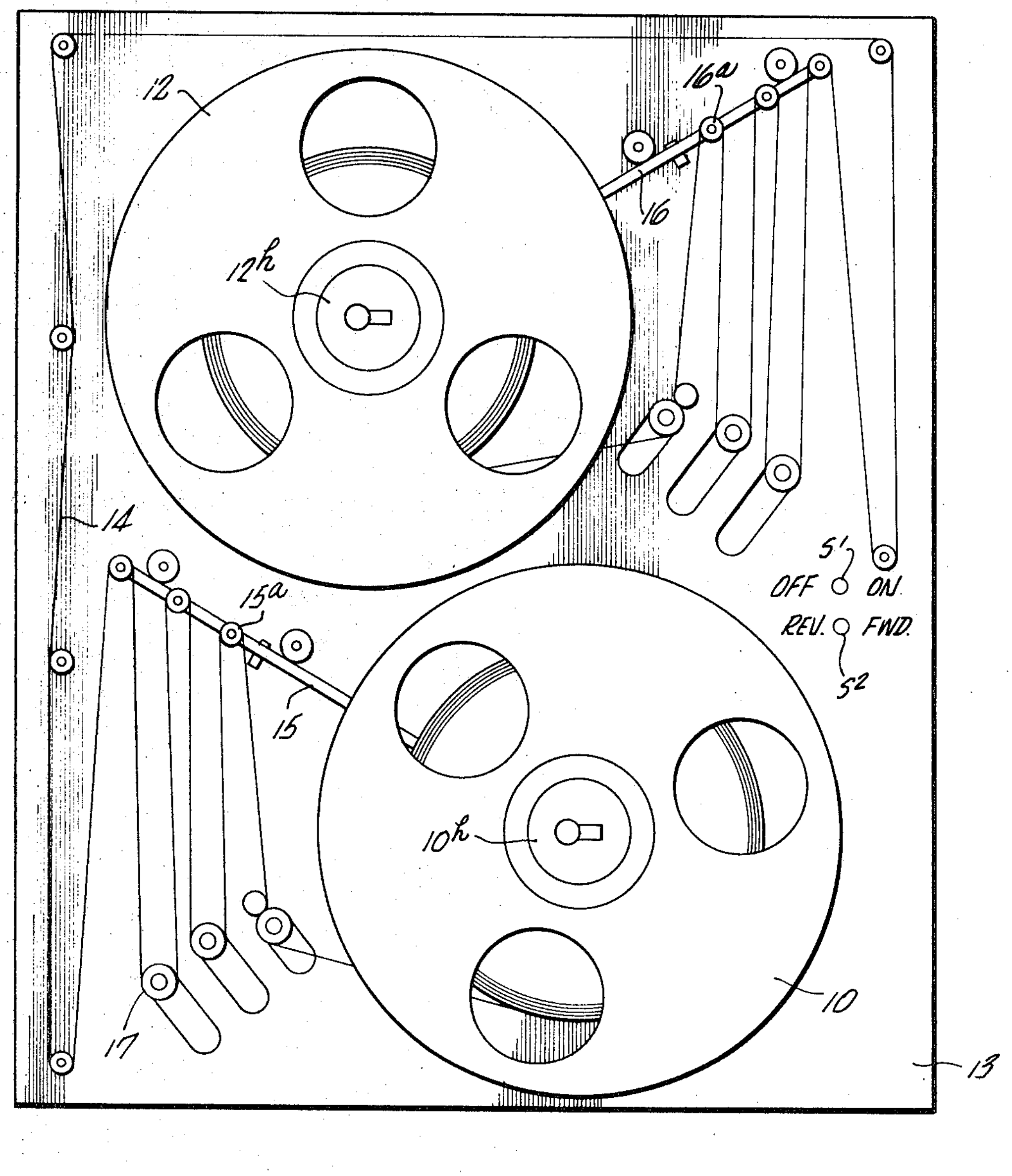
FIG. 1 is a front elevational view of a typical paper tape transport system embodying the invention.

Now referring to the drawing, the spooler of the present invention will be examined in detail. It should be understood that although the present invention is incorporated in a tape transport system for paper tape spooling that it may be employed in a paper tape reader and spooler combination or may be used in any reel-to-reel transport system for transferring tape from one reel to another without reference to the type of tape material being transferred.

Referring to FIG. 1 wherein there is illustrated a pair of tape storage reels or spools 10 and 12 mounted on a panel 13 in spaced-apart relationship for transferring paper tape 14 therebetween. The paper tape 14 is illustrated extending between the reels 10 and 12. The tape transport system includes tape tensioning arms 15 and 16 associated with each reel 10 and 12. The tape tensioning arm 15 is associated with the reel 10, while the tensioning arm 16 is associated with the reel 12. The tape transport system includes conventional tape guiding means typified by the guide means 17 mounted at preselected points on the panel 13 for guiding tape 14 as it is transported between the reels. As is conventional, the tape tensioning arms 15 and 16 also include tape guide means such as the guide 15$^a$ mounted on the tension arm 15. As illustrated in FIG. 1, the tape transport system is controlled by means of the power switch identified as the switch $S_1$, along with a spooler directional control switch $S_2$. The switch $S_2$ functions to control the direction of transfer of the tape between the reels 10 and 12 for rewinding only.

At this point it would be well to note that it is convenient to consider the reel 10 mounted towards the bottom of the panel 13, as illustrated in FIG. 1, as the left-hand reel and the reel 12 as the right-hand reel. Also, it should be understood that when it is desired to transport tape from the right to the left or in a counterclockwise direction that the tape is being transferred from the reel 12 onto the reel 10. Under these circumstances (in rewind only) then the drive motor for the reel 10 is energized and drives the reel 10, while the tension thus produced in the tape effects the unwinding of the tape from the reel 12 to produce the desired spooling action.

Figure 2:
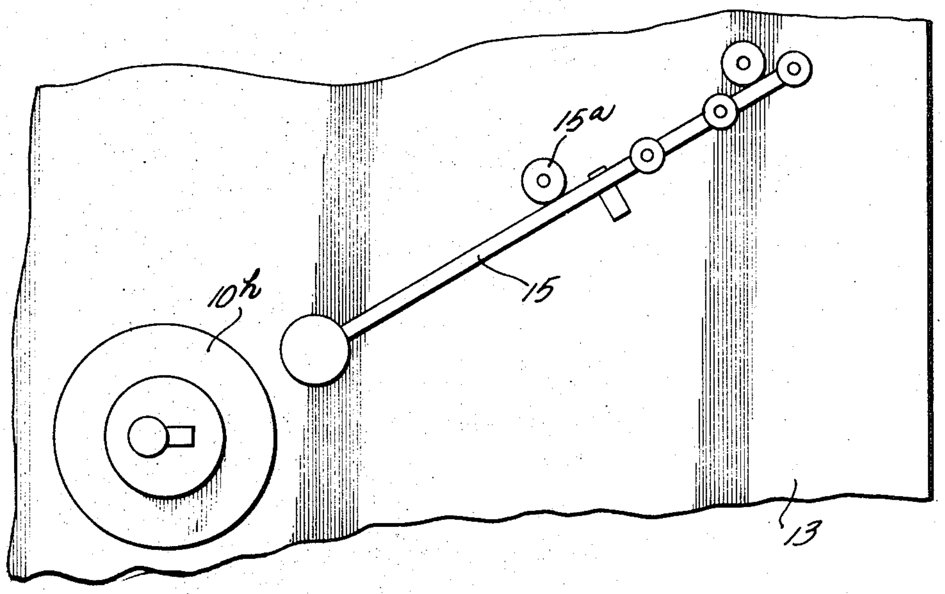
FIG. 2 is a partial view of one of the tape reels of the tape transport system of FIG. 1 showing the tape reel removed therefrom.

The tape tensioning arms 15 and 16 are mounted in a spaced-apart relationship with the hubs 10$^h$ and 12$^h$ provided for the respective reels 10 and 12. The tape tensioning arms 15 and 16 are similarly mounted on the panel 13 in side by side relationship with their respective hubs, as is illustrated in FIG. 2. The tensioning arm 15 is mounted to the panel 13 by means of a rotatable shaft 20 suitably journaled thereon. The shaft 20 is adapted to be rotated in response to the tension exerted thereon by the tape 14 extending between the tensioning arms 15 and 16 during the tape transfer operations. This swinging action of the tape tensioning arms 15 and 16 is employed in the present invention for signalling the demand for tape and the continuing changes in tape tension for effecting the desired control of the rate of transfer of tape. To this end the mounting shaft 20 is secured to the inner end of the tension arm 15, the end adjacent the hub 10$^h$, and carriers a gear 21 to be rotatable in unison with the movements of the tensioning arm 15. The gear 21 is coupled or meshed with a drive gear 22 mounted to the control shaft of a potentiometer 23.

Figure 3:
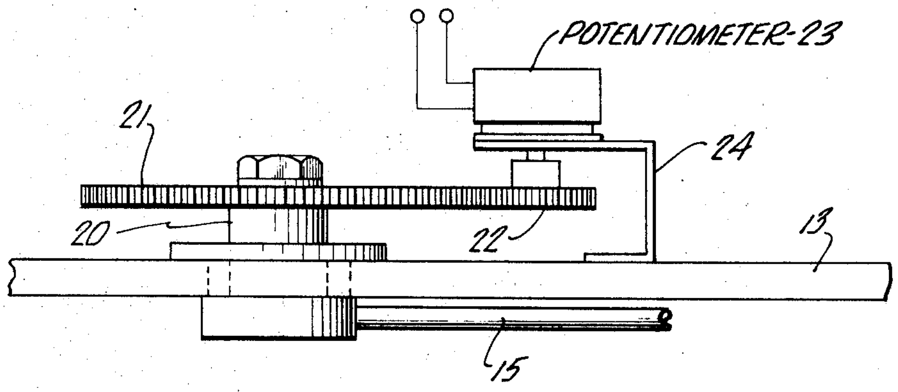
FIG. 3 is a partial, top plan view of a tensioning arm and the associated signalling means.

The potentiometer 23 is secured to the rear of the mounting panel 13 by means of a mounting bracket 24, as best illustrated in FIG. 3. It should be evident that with the movements of the tensioning arm 15 in response to the change in tension, that the shaft 20 and the gear 21 are rotated in unison therewith and thereby rotate the gear 22 to change the position of the movable arm of the potentiometer 23. This change in position of the control shaft of the potentiometer 23 is effective for changing the output signal from the potentiometer 23 and is the signal that is employed in the control circuit for effecting the desired control of the transfer of the tape between the reels 10 and 12.

It should be recognized at this point that the control circuits for effecting the desired transfer of tape from one reel to the other reel is identical for the individual drive motors for the reels 10 and 12. Accordingly, the control circuit for only one drive motor need be examined. In the same fashion, the drive or powering of the drive motor for rotation in either a clockwise or a counterclockwise direction is essentially identical in accordance with the present invention and again only the operation for a single direction need be considered. This should be more evident in view of the above remarks relative to the conventional spooling or rewind operation wherein only one of the drive motors for the reels is driven while the other reel is free wheeling or rotates in response to the tension resulting from driving the one motor. These considerations, then, will simplify the examination of the present invention.

Figure 4:
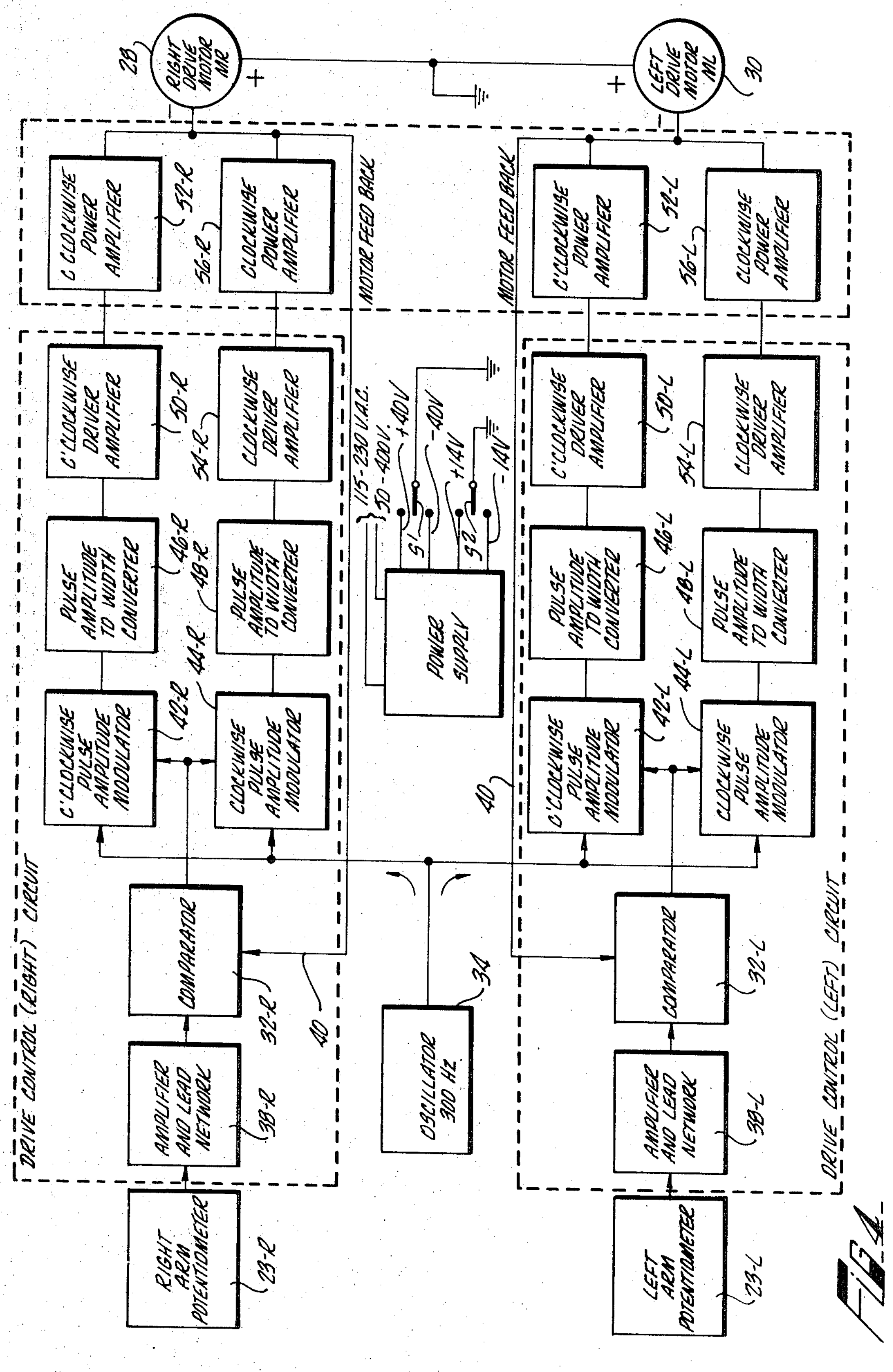
FIG. 4 is a block diagram of the control circuit for the tape transport system of the present invention.

Now referring to FIG. 4, in particular, the control system for effecting the spooling operations employing the potentiometer signals will be examined. It should be noted that a drive motor 28 is employed for driving the reel 12. In the same fashion the left drive motor or the motor 30 is employed for driving the reel 10. As discussed hereinabove, the potentiometers 23 are employed with the tensioning arms 15 and 16. The block diagram representation of the potentiometers 23 in FIG. 4 further identifies the potentiometers 23 as the potentiometer 23-L and potentiometer 23-R for use with the left drive motor 30 and the right drive motor 28, respectively. It should be appreciated that both motors are energized to turn in the same direction at any one time during the spooling operation with the takeup reel motor always exerting more torque than the payout reel motor. This difference in torque between the two reels keeps the tape under tension. At rest the motor torques are in opposite directions thus maintaining the tape tension.

In general, the control circuit of the present invention is a closed loop system employing a feedback signal from the drive motor in combination with the signals from the potentiometers 23 for effecting the speed control of the drive motors 28 and 30. The feedback signal from the drive motors 28 and 30 that is employed is the back electromotive force (back EMF) from the motor armatures. This feedback signal is applied to a suitable comparator for comparison with the signal from the potentiometers. The comparison or the output signal from the comparator is employed in combination with an oscillator signal provided by an oscillator 34. The oscillator 34 provides a signal of a preselected frequency and is employed for both the left and right drive circuits. The output of the oscillator is applied to pulse modulator networks in combination with the output signal from the comparator for providing an output pulse having a constant amplitude and varying widths (width modulated) in accordance with the output signal derived from the comparator. The oscillator 34 has an output frequency preferably higher than the mechanical response frequency of the drive motors for smooth low-speed motor operation.

The pulses modulated in this fashion, then, are applied to the drive circuit for energizing the windings of the drive motors 28 and 30 in the correct direction for effecting the desired speed control. It should be evident that the changes in tension on the tape extending between the reels 10 and 12 effectively signal the direction and speed of tape transfer by means of the potentiometers 23. Accordingly, with the changes in tension, these speed changes are compared with the feedback speed signal from the motors themselves to effect the desired width modulation of the pulses from the oscillator or pulse generator 34 and thereby effect the desired speed control. It will be recognized that in FIG. 4 the blocks representative of the same circuit elements are identified by the same reference numeral except that the elements for the left drive motor all include the letter L with the reference numeral identification, while the identical element for the right control circuit has the same reference numeral accompanied by the letter R.

Figures 5, 6:
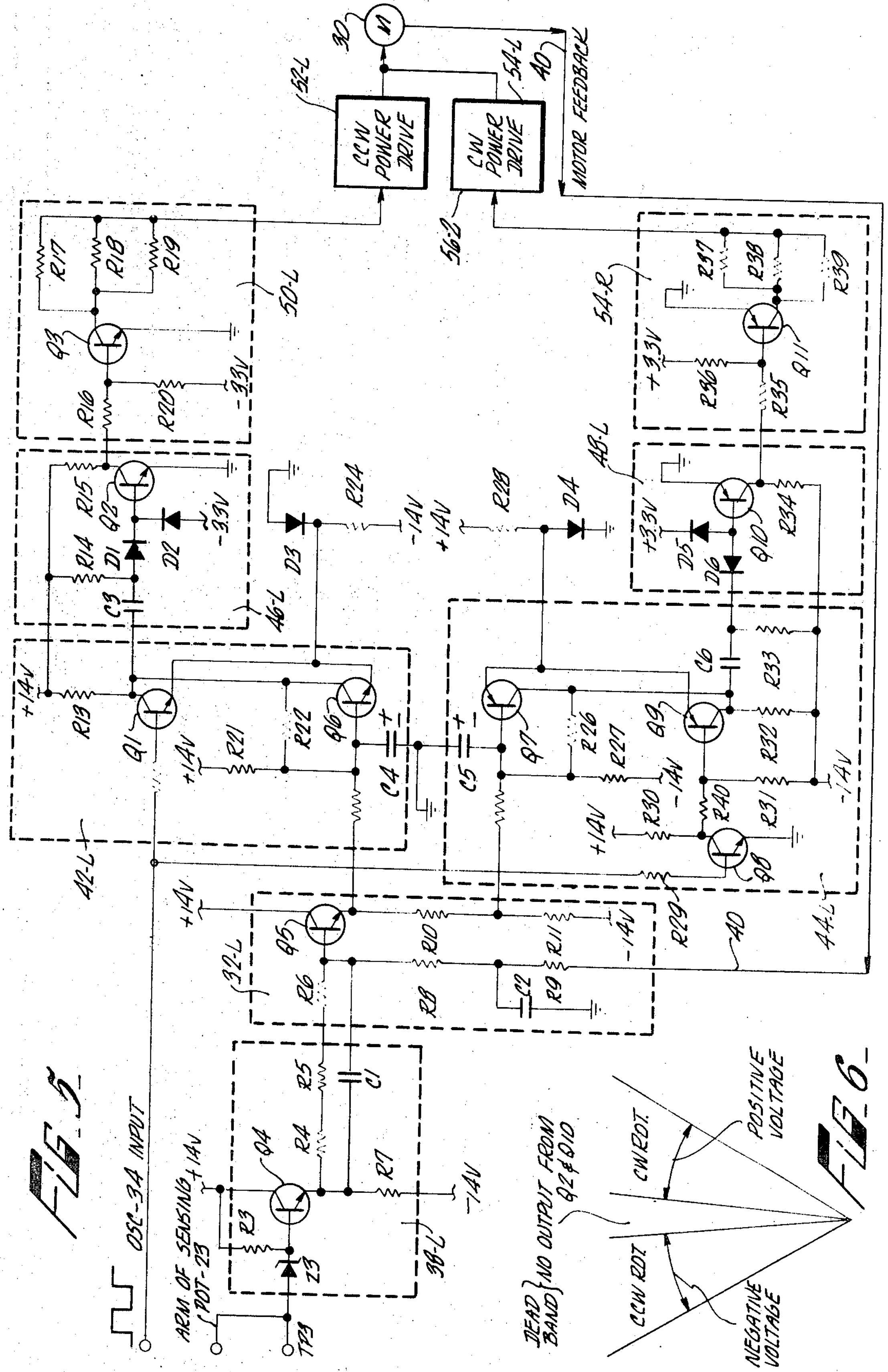
FIG. 5 is a schematic circuit diagram of the drive control circuit in accordance with the block diagram of FIG. 4.
FIG. 6 is a schematic illustration of the zones through which the tension arms swing.

The control action can be better appreciated in view of the above general explanation through an examination of the detailed schematic circuit diagram for one of the drive motors; See FIG. 5. The schematic diagram of FIG. 5 illustrates in detail the circuit for effecting the drive in both a clockwise and counterclockwise direction for one motor. It should be appreciated that with the drive motors 28 and 30 inoperative that the tape tensioning arms 15 and 16 are normally located midway between their respective stops since the tape is not in motion. The area in which tensioning arms 15 and 16 are located during these inoperative periods may be considered a dead band from which no effective output signal is provided from the potentiometers 23 except that which provides the minimum torque to maintain the tape tension. Operation of the tape sensing arm due to tape demand in either direction produces an input signal to the lead network 32-L, comparator 32-L and clockwise and counterclockwise modulators 42-L and 44-L. The negative output signal from the comparator 32-L causes the clockwise modulator 44-L to be turned off and the counterclockwise modulator 42-L to be turned on. The output from the counterclockwise modulator 42-L is a series of positive pulses whose amplitude is proportional to the negative modulating input from the comparator 32-L. The modulator 42-L produces a series of positive pulses whose amplitude is proportional to the negative modulating input from the comparator 32-L. The pulse amplitude to width converter 46-L converts the positive amplitude modulated pulses to constant amplitude, width modulated pulses which are employed through the driver amplifier 50-L, power amplifier 52-L to energize the motor 30 for variable time periods. This initiates the transfer of tape in the counterclockwise direction. With the energization of the motor 30, a counter EMF is generated and fed back to the comparator 32-L. The motor feedback signal causes the output of comparator 32-L to move in a positive direction and thereby reduces the amplitude of the positive pulses provided by the modulator 42-L. These amplitude modulated pulses are width modulated by the converter 46-L and the resulting output pulses are reduced in width and thereby the time period the motor 30 is energized is reduced. This action continues until balance is achieved, theoretically the pulse width is zero if the tape is maintained at zero tension. However, since the tape is always under some tension, this tension is supplied by opposing motor torques on each reel.

The negative signal provided to the network 38-L is a result of tension arm 15 swinging in a counterclockwise direction in response to tape demand. The network 38-L of FIG. 5 shown within the dotted outline comprises the current amplifier illustrated as the transistor Q4 and its associated network. The output signal from the current amplifier Q4 is applied to the comparison circuit 32-L. The comparison circuit comprises the transistor Q5 arranged as a current amplifier and having its base electrode arranged as a summing junction. At this junction the signal from the current amplifier Q-4 is summed with the motor feedback signal applied thereto by means of the lead wire 40. The summing junction, then, at the base electrode for the transistor Q5 is the junction between the resistors identified as the feedback resistor R8 and the base resistor R6. The signals applied to this summing junction are arranged in a differential relationship whereby the motor feedback signal bucks the signal from the potentiometer 23 derived from the network 38-L. The output of the comparison amplifier Q5 represents the current amplified version of this difference signal and which signal is employed in the speed control arrangement. As is evident from both FIGS. 4 and 5 the output from the comparators 32-L and 32-R, individual to the drive circuits for the motors 30 and 28 are employed for effecting both the clockwise and the counterclockwise spooling and which signals are applied to the corresponding pulse amplitude modulators 42 and 44 for this purpose, as mentioned hereinabove.

The counterclockwise pulse amplitude modulator 42-L, as illustrated in FIG. 5, comprises the transistors Q1 and Q6. The corresponding element is the clockwise pulse amplitude modulator 44-L which comprises the transistors Q7, Q8 and Q9. The transistors Q6 and Q7 are adapted to function as class A amplifiers in response to the output signals from the comparator 32-L and provide the output signal at the output electrode of the associated transistors Q1 and Q9, respectively, for controlling the output signals therefrom. Specifically, the signal coupled to the collector electrode of the transistor Q1 from the transistor Q6 functions as a variable clamp level effective for changing the time constant of the R-C network associated with the transistor Q1. This network comprises the elements R14 and C3. The output signal from the transistor Q6 is connected to the collector electrode of Q1 in common with one of the plates for the capacitor C3. The variable clamp level provided is effective to change this time constant and thereby control the output pulse width for the pulse width converter 46-L illustrated in FIG. 5 as the transistor circuit Q2. This same action results for the clockwise rotation of the motor 30 through a pulse amplitude to width converter 48-L comprising the transistor circuit Q10. This action can be better appreciated when it is recalled that the output from the oscillator 34 is applied directly to the pulse amplitude modulators 42-L, 44-L and 42-R and 44-R. This oscillator input signal, as illustrated in FIG. 5, is applied directly to the base electrodes for the transistors Q1 and Q8. Accordingly, the output from the transistor Q1 is effected by the variable clamp level provided from the amplifier Q6 which in turn governs the R-C time constant of the associated network and thereby the signal applied to the transistor Q2. This results is an output pulse from Q2 having a fixed amplitude and a variable width derived from the collector electrode of the transistor Q2. This output signal is applied to the counterclockwise driver amplifier network 50-L. In FIG. 5 this driver amplifier 50-L is illustrated as the transistor Q3. The output of the driver amplifier 50-L is applied to a conventional power amplifier 52-L for energizing the windings of the left drive motor 30 to effect the transfer of tape to the left. The counterclockwise driver amplifier is identified by the reference number 54-L and its corresponding power amplifier by the reference numeral 56-L. In summary then the operation of the tape transport system is such that upon demand to move tape from right to left, thereby transferring tape from reel 12 to reel 10, results in a change of tension swinging the tensioning arm 15 and operating its corresponding potentiometer 23-L. The amplified variation of the signal from the potentiometer 23-L is applied to the comparator circuit 32-L along with the feedback signal from the drive motor 28 to provide a speed control circuit to the pulse amplitude modulators 42-L and 44-L from the comparator 32-L. Since the demanded action for the transferring of tape is in the counterclockwise direction, the counterclockwise pulse amplifier 42-L is energized and provides the output pulse to the pulse amplitude to width converter 46-L. The output signal from the element 46-L is a pulse having the same repetition rate as the oscillator 44 but of varying width. The speed control signal derived from the width modulator circuit 46-L is amplified and applied to the drive motor 30 to effect the desired energization of the motor in the counterclockwise direction to produce the desired transfer of tape from reel 12 to reel 10 at the desired speed. The identical action occurs when a clockwise tape transfer is initiated through the left drive motor 30. It will also be appreciated that with the transfer of tape from reel 10 onto the reel 12 that the left drive circuit will be operated in the identical fashion.

As is noted in FIG. 6, when a clockwise rotation of the motor is desired such as when tape is to be moved from left to right, the tension arms swing in a clockwise direction to provide a positive output signal while the motor feedback signal is negative. The positive output signal from the comparators 32 will cause the clockwise pulse modulators 44 and their associated circuits to be energized while the modulators 42 are deenergized.

I claim:

1. In a reel-to-reel tape transport system for transferring tape from one storage reel to another storage reel including:
   - a pair of rotatable tape storage reels mounted in a spaced-apart relationship and having tape extending between the reels,
   - means for driving at least one of the storage reels to transfer tape onto the driven reel from the other reel,
   - means for sensing the demand of tape for transferring tape from reel to reel and providing an electrical signal corresponding thereto,
   - control circuit means connected to be responsive to the signal from said sensing means for actuating said one drive means, said control circuit means including
   - means for providing a feedback signal from said one drive means representative of the speed of said drive means,
   - means for comparing the feedback signal and the signal from said sensing means and providing an output control signal corresponding thereto,
   - means for generating electrical signals of a preselected frequency,
   - means for combining the signals of a preselected frequency and the output control signal to provide a speed control signal corresponding thereto, and
   - means for applying the speed control signals to said one drive means.

2. In a reel-to-reel tape transport system as defined in claim 1 wherein the means for generating the signals of a preselected frequency comprises oscillator means for generating pulses of a preselected repetition rate faster than the mechanical time constant of the drive means.

3. In a reel-to-reel tape transport system as defined in claim 2 wherein said combining means modifies the pulses from the oscillator by varying the widths of the pulses in accordance with the control signal from said comparison means.

4. In a reel-to-reel tape transport system as defined in claim 3 wherein said means for sensing includes tape tensioning means for sensing the tension on the tape extending between the reels providing an electrical signal corresponding to the tension of the tape.

5. In a reel-to-reel tape transport system as defined in claim 4 wherein said sensing means includes a swingable tape tension arm mounted adjacent one of the reels and engaging the tape extending between the reels to be swingable in response to the changes in tape tension, and electrical signalling means associated with the tension arm and coupled to be responsive to the positions of the arm for providing electrical signals corresponding thereto.

6. In a reel-to-reel tape transport system as defined in claim 5 wherein said sensing means includes a swingable arm mounted adjacent each of said reels for engaging the tape from the associated reel and movable in response to the changes in tape tension with changes in the drive means for transferring tape from one reel to the other reel, electrical signalling means associated with each swingable arm and coupled to be responsive to the positions of the arm for providing electrical signals corresponding thereto.

7. In a reel-to-reel tape transport system as defined in claim 6 wherein said electrical signalling means comprises individual potentiometer means for each tension arm having a movable arm and means coupled between each of the tension arms and the individual potentiometer arms for changing the position of the latter arms to correspond to the position of the individual tension arms.